United States Patent
Williams

(10) Patent No.: US 10,469,850 B2
(45) Date of Patent: Nov. 5, 2019

(54) IMAGE HISTOGRAM COMPRESSION END POINT PAIR SELECTION BASED ON A TARGET COLOR SPACE RANGE

(71) Applicant: Hewlett-Packard Development Company, L.P., Houston, TX (US)

(72) Inventor: Bruce Williams, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 215 days.

(21) Appl. No.: 15/558,938

(22) PCT Filed: Jun. 23, 2015

(86) PCT No.: PCT/US2015/037139
§ 371 (c)(1),
(2) Date: Sep. 15, 2017

(87) PCT Pub. No.: WO2016/209209
PCT Pub. Date: Dec. 29, 2016

(65) Prior Publication Data
US 2018/0084262 A1 Mar. 22, 2018

(51) Int. Cl.
*G06K 9/00* (2006.01)
*H04N 19/186* (2014.01)
(Continued)

(52) U.S. Cl.
CPC ......... *H04N 19/186* (2014.11); *G06T 1/0021* (2013.01); *G06T 5/40* (2013.01);
(Continued)

(58) Field of Classification Search
None
See application file for complete search history.

(56) References Cited

U.S. PATENT DOCUMENTS 5,164,993 A 11/1992 Capozzi et al.
6,048,311 A 4/2000 Washburn et al.
(Continued)

FOREIGN PATENT DOCUMENTS

| CN | 103310406 | 9/2013 |
|---|---|---|
| EP | 1385121 | 1/2004 |

OTHER PUBLICATIONS

Chandrasekhar, et al. CHoG Compressed Histogram of Gradients. A Low Bit-Rate Feature Descriptor~International Journal of Computer Vision v 96 Issue 3~2012~pp. 384-399.
(Continued)

*Primary Examiner* — Stephen P Coleman
(74) *Attorney, Agent, or Firm* — HP Inc. Patent Department

(57) ABSTRACT

Examples disclosed herein relate to selecting an image histogram compression end point pair based on a target color space range. Examples disclosed herein may select a histogram compression end point pair from a list of histogram compression end point pairs related to a target color space range where the selection is based on the results of the application of the histogram compression end point pair to the pixels within the input image with color values within a reduced color space determined based on the target color space range. The processor may apply the selected histogram compression end point pair to the input image to histogram compress the input image.

15 Claims, 9 Drawing Sheets

(51) Int. Cl.
*G06T 5/40* (2006.01)
*H04N 19/98* (2014.01)
*G06T 1/00* (2006.01)

(52) U.S. Cl.
CPC ...... *H04N 19/98* (2014.11); *G06T 2201/0053* (2013.01); *G06T 2207/10024* (2013.01)

(56) References Cited

U.S. PATENT DOCUMENTS

| | | |
|---|---|---|
| 6,542,626 B1 | 4/2003 | Brouwer et al. |
| 7,006,688 B2 | 2/2006 | Zaklika et al. |
| 7,206,447 B2 | 4/2007 | Wang |
| 7,583,260 B2 | 9/2009 | Plut |
| 7,680,327 B2 | 3/2010 | Weiss |
| 8,253,752 B2 | 8/2012 | Raveendran |
| 2005/0192943 A1 | 9/2005 | Siddiqui et al. |
| 2006/0029274 A1 | 2/2006 | Inoue |
| 2007/0115372 A1 | 5/2007 | Wu et al. |
| 2007/0297690 A1 | 12/2007 | Yu et al. |
| 2015/0063693 A1 | 3/2015 | Carmel et al. |

OTHER PUBLICATIONS

Xuan G et al: "Optimum histogram pair based image lossless data embedding", IWDW 2007; 2008, pp. 264-278.
Xuan Guorong et al: "Optimal Histogram-Pair and Prediction-Error Based Image Reversible Data Hiding", IWDW 2012~pp. 368-383~Nov. 2012.

COLOR IN REDUCED COLOR SPACE COMPARED
TO APPLICABLE POTENTIAL HISTOGRAM
COMPRESSION END POINT PAIRS FOR
PRESERVING SHIFT ROOM

COLOR 0,0,0: (2, 255), (2, 254)
COLOR 0,0,1: (1, 255), (1, 254), (2, 255), (2, 254)
COLOR 0,0,255: (1, 254), (2, 254)
COLOR 0,1,0: (2, 255), (2, 254)
COLOR 0,1,1: (1, 255), (1, 254), (2, 255), (2, 254)
COLOR 0, 1, 255:   (1, 254), (2, 254)
COLOR 1,0,0: (2, 255), (2, 254)
COLOR 1,0,1: (1, 255), (1, 254), (2, 255), (2, 254)
COLOR 1,0,255: (1, 254), (2, 254)
COLOR 1,1,0: (2, 255), (2, 254)
COLOR 1,1,1: (1, 255), (1, 254), (2, 255), (2, 254)
COLOR 1,1,255: (0, 254), (1, 254), (2, 254)

| End Point Pairs | Number of Pixels in Target Color Space Range for Given Color (R,G,B) After Histogram Compression | | | | | | | | | Colors Outside Reduced Color Space | Total Pixels in Target Color Space Range After Histogram Compression |
|---|---|---|---|---|---|---|---|---|---|---|---|
| | 0,0,0 | 0,0,1 | 0,0,255 | 0,1,0 | 0,1,1 | 0,1,255 | 1,0,0 | 1,0,255 | 1,1,0 | 1,1,1 | 1,1,255 | | |
| 0, 255 | 0 | 0 | 0 | 0 | 0 | 0 | 0 | 0 | 0 | 0 | 0 | 80 | 80 |
| 1, 255 | 0 | 30 | 0 | 4 | 0 | 0 | 0 | 0 | 0 | 0 | 0 | 80 | 114 |
| 0, 254 | 0 | 0 | 0 | 0 | 0 | 0 | 0 | 0 | 0 | 0 | 0 | 80 | 80 |
| 2, 255 | 0 | 30 | 2 | 4 | 0 | 0 | 2 | 0 | 0 | 0 | 0 | 80 | 118 |
| 1, 254 | 0 | 30 | 0 | 4 | 0 | 0 | 0 | 2 | 0 | 0 | 0 | 80 | 116 |
| 2, 254 | 0 | 30 | 2 | 4 | 0 | 0 | 2 | 2 | 0 | 0 | 0 | 80 | 120 |

302

THRESHOLD FOR NUMBER OF PIXELS OUTSIDE
TARGET COLOR SPACE = 5%

HISTOGRAM COMPRESSION END POINT PAIR
CANDIDATES
(1, 255), (2, 255), (1, 254), AND (2, 254)

COMPRESSION RANGE PRIORITIZATION

LEVEL 0: (0, 255)
LEVEL 1: (1, 255), (0, 254)
LEVEL 2: (2, 255), (1, 254),
LEVEL 3: (2, 254)

309

SELECT HISTOGRAM COMPRESSION END POINT PAIR (1, 255)

IMAGE HISTOGRAM COMPRESSION END POINT PAIR SELECTION BASED ON A TARGET COLOR SPACE RANGE

BACKGROUND

An image may be histogram compressed to lessen the color range of the image. For example, it may be desirable to have a particular amount of color room for a color channel on the low and/or high end of the spectrum. A processor may histogram compress the image such that the color range of the image fits within the target color space range.

BRIEF DESCRIPTION OF THE DRAWINGS

The drawings describe example embodiments. The following detailed description references the drawings, wherein:

FIG. 3A-3E are diagrams illustrating one example of selecting a histogram compression end point pair based on a target color space range.

DETAILED DESCRIPTION

Figure 1:
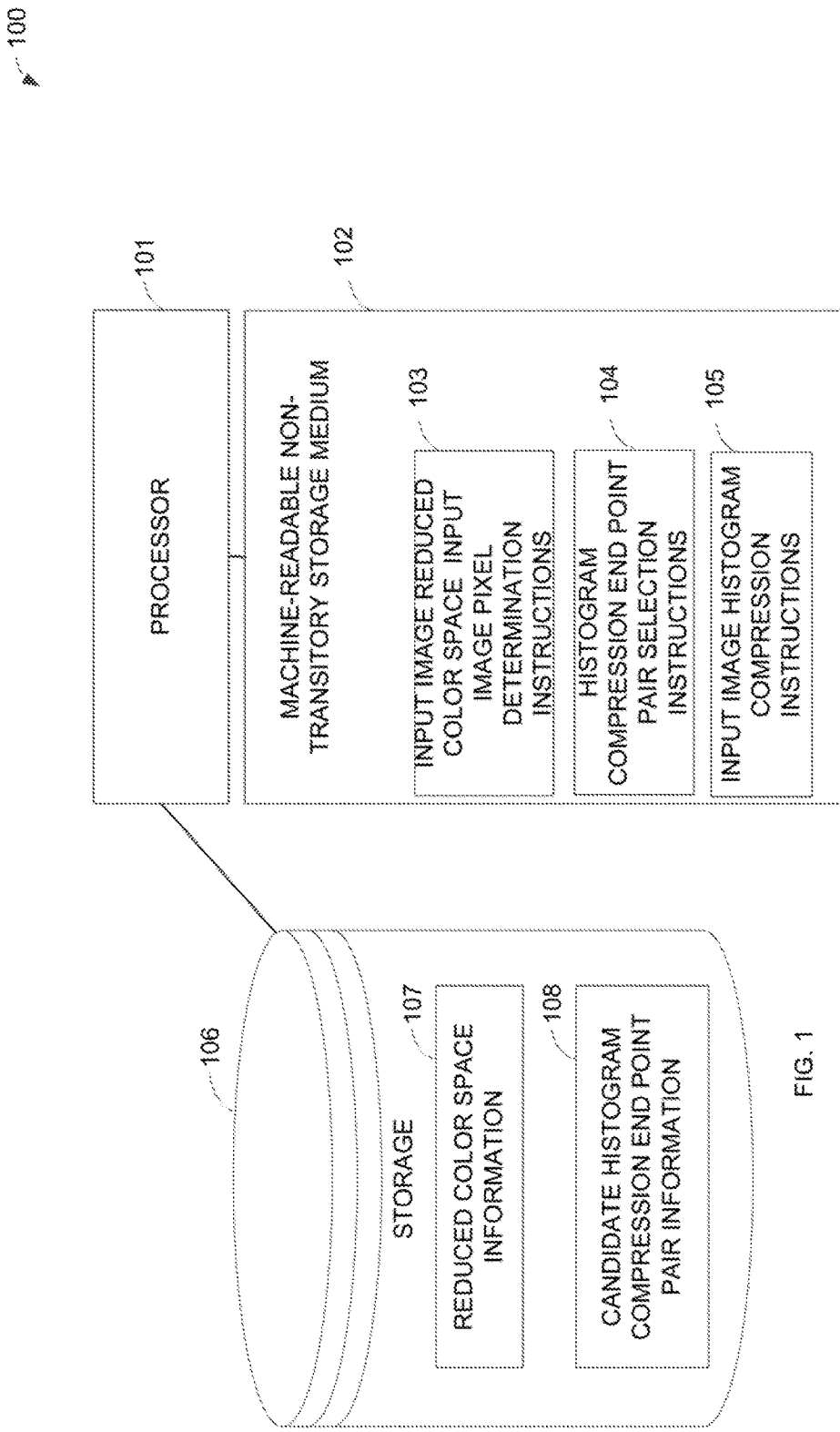
FIG. 1 is a block diagram illustrating one example of a computing system to select an image histogram compression end point pair based on a target color space range.

A processor may histogram compress an image such that the tonal range of the image is lessened with some lighter colors made darker and some darker colors made lighter, resulting in a grayer image. The tonal range may be reduced such that the colors fall within a target color space range, in some cases a specific target color space range for each channel. For example, the target color space range for the green color channel in an R, G, B color may be between 2 and 252, and the blue color channel target color space range is between 6 and 250. Histogram compressing an image into a target color space may be useful for some types of image post processing. For example, it may be desirable to have the color space range of the image compressed such that the image does not include colors at extreme ends of the color spectrum. A processor may determine the target color space range based on an amount of color space at the low and/or high end of the color spectrum that is to be used for post-processing. A processor may perform histogram compression prior to performing other image processing, such as prior to watermarking an image. For example, a processor may digitally watermark an image to encode identifying information on the digital image.

A processor may histogram compress an image based on a histogram compression end point pair. The target color value range may differ for each color channel, but the histogram compression end point pair may be uniform for each color channel. For example, the color information in each color channel may be histogram compressed in the same manner to preserve the look of the image, such as where a 5 in the blue color channel is histogram compressed to 7, and a 5 in the green color channel is histogram compressed to 7. The colors may be linearly histogram compressed between the two values of the histogram compression end point pair.

In one implementation, a processor selects histogram compression color end point pair information based on the effect on a particular input image. The end point pair may include a low value and high value between which pixel colors in an input image are linearly compressed to achieve an image within a target color space range. There may be a threshold associated with the target color space range, such as where 90% of the pixels within the input image are to be within the target color space range. A processor may select a histogram compression end point pair based on the ability to histogram compress at least the threshold amount of the input image into the target color space range and based on other criteria associated with the histogram compression, such as the amount of additional pixels that are compressed outside of the threshold amount or the particular colors that are histogram compressed. For example, the processor may select a histogram compression end point pair that histogram compresses more in lighter colors than in darker colors.

In one implementation, a processor determines and stores information related to candidate histogram compression end point pairs related to a target color space range. The processor may also determine and store information related to a reduced applicable color space relevant to the histogram compression, such as colors that would be histogram compressed to fit within the target color space range when the candidate histogram compression end point pairs are applied. For example, the colors may be histogram compressed to fit within a target color space range that provides a target shift room at the low end and/or high end of the color spectrum. The processor may then analyze the colors in an input image in the reduced color space in connection with the candidate histogram compression end point pairs to select a histogram compression end point pair for the particular input image. For example, a histogram compression end point pair of 2 to 252 or 0 to 252 may be used to histogram compress an image into a target color space of values between 2 and 252 for each color. An input image with the lowest value pixel channel color at 10 which is within the target color value range may be histogram compressed using the histogram compression end point pair of 0 to 252. The histogram compression end point pair 2 to 252 may not be selected because it causes more distortion than the 0 to 252 pair which also achieves the target color space range goal. A second input image with the lowest value pixel at 1 may be histogram compressed using the histogram compression end point pair 2 to 252 because the histogram compression end point pair 0 to 252 may not result in the threshold amount of the second input image being histogram compressed into the target color space range. Using the stored relevant reduced color space information and correlating histogram compression end point pairs information to apply at run time to color pixel information related to a specific input image allows for histogram compression to be performed more quickly while using more preferable histogram compression end point pairs that cause less distortion for the particular image.

FIG. 1 is a block diagram illustrating one example of a computing system to select an image histogram compression end point pair based on a target color space range. For example, the computing system 100 may select a histogram compression end point pair based on its effect on a particular input image and histogram compress the input image using the selected histogram compression end point pair. The computing system 100 includes a processor 101, a machine-readable non-transitory storage medium 102, and storage 106. The computing system 100 may histogram compress an image to reduce the color range to prevent color channels from being at low and/or high levels. The computing system 100 may then perform post processing on the output image that includes the smaller color range. For example, the computing system 100 may apply a watermark to the histogram compressed version of the input image.

The processor 101 may be a central processing unit (CPU), a semiconductor-based microprocessor, or any other device suitable for retrieval and execution of instructions. As an alternative or in addition to fetching, decoding, and executing instructions, the processor 101 may include one or more integrated circuits (ICs) or other electronic circuits that comprise a plurality of electronic components for performing the functionality described below. The functionality described below may be performed by multiple processors.

The storage 106 may be any suitable storage for storing information and communicating with the processor 101. The storage 106 may be, for example, a non-volatile memory associated with an electronic device including the processor 101, RAM storage accessible to the processor, or an external database communicating with the processor 101 via a network. The storage 106 may store reduced color space information 107 and candidate histogram compression end point pair information 108. The processor 101 may access the information in the storage 106 when determining a histogram compression end point pair to use to histogram compress an input image while maintaining a percentage less than a threshold of pixels in the input image outside of the target color range.

The reduced color space information 107 may include information related to the subset of a full color space to which the histogram compression is likely to be applicable. For example, a target color space range may leave empty color room at the low and high end of each color channel, and colors near the middle of the range for each color may remain within the target color space range with and without histogram compression. For example, a color 125, 125, 125 is not histogram compressed to stay within a target color space of min 3,2,2 for R,G,B color pixels respectively and max 252,254,250 for R,G,B color pixels respectively. The reduced color space information 107 may be determined by the processor 101 or another processor. The reduced color space information 107 may include both colors outside of the target color range and colors that may fall outside of the target color range when histogram compressed.

The candidate histogram compression end point pair information 108 may include a list of candidate histogram compression end point pairs that when applied to the reduced color space result in reduced tonal range image associated with the target color space range. The histogram compression end point pair may be pair values with a low value and high value between which the color pixels in the image are linearly histogram compressed. A processor, such as the processor 101, may determine the set of candidate histogram compression end points pairs. For example, the candidates may represent different candidates that may histogram compress an image within the target range depending on the pixel color values within the input image in the reduced color space affected by the histogram compression.

The processor 101 may communicate with the machine-readable storage medium 102. The machine-readable storage medium 102 may be any suitable machine readable medium, such as an electronic, magnetic, optical, or other physical storage device that stores executable instructions or other data (e.g., a hard disk drive, random access memory, flash memory, etc.). The machine-readable storage medium 102 may be, for example, a computer readable non-transitory medium. The machine-readable non-transitory storage medium 102 may include instructions executable by the processor 101. For example, the machine-readable storage medium 102 may include input image reduced color space input image pixel determination instructions 103, histogram compression end point pair selection instructions 104, and input image histogram compression instructions 105.

The input image reduced color space input image pixel determination instructions 103 include instructions to determine pixels within an input image with color values within the reduced color space. For example, the processor 101 may compare pixel colors in an input image to the reduced color space information 107. The processor may determine the number of pixels in the input image of each of the colors in the reduced color space. The processor may compare the input image to the reduced color space so that a histogram compression end point pair may be selected that histogram compresses a percentage of the pixels in the input image above a threshold into the target color range. For example, there may be 10 colors in the reduced color space, with 2 of those 10 colors appearing in the input image. As such, a histogram compression end point pair that minimally histogram compresses the input image while histogram compressing the particular two colors within the target color space range is desired.

The histogram compression end point pair selection instructions 104 includes instructions to select candidate histogram compression end point pairs from the stored candidate histogram compression end point pair information 108. The processor 101 may select a histogram compression end point pair that has the least impact on the input image while still histogram compressing the image such that a number or percentage of pixels above a threshold in the input image are within the target color space. The processor 101 may prioritize the list of candidate histogram compression end point pairs and select the stored histogram compression end point pair based on the prioritization. For example, the processor 101 may prioritize the histogram compression end point pairs based on whether they compress more in darker or lighter areas of the color spectrum and then select based on impact on the input image.

The input image histogram compression instructions 105 include instructions to histogram compress the input image using the selected histogram compression end point pair. For example, the processor 101 may histogram compress the input image such that the resulting image has less than a threshold amount of pixel data outside of the target color space. The processor 101 may store, transmit, or display the histogram compressed image. In one implementation, the processor 101 performs image processing on the histogram compressed image. For example, the processor 101 may apply a watermark to the histogram compressed image.

Figure 2:
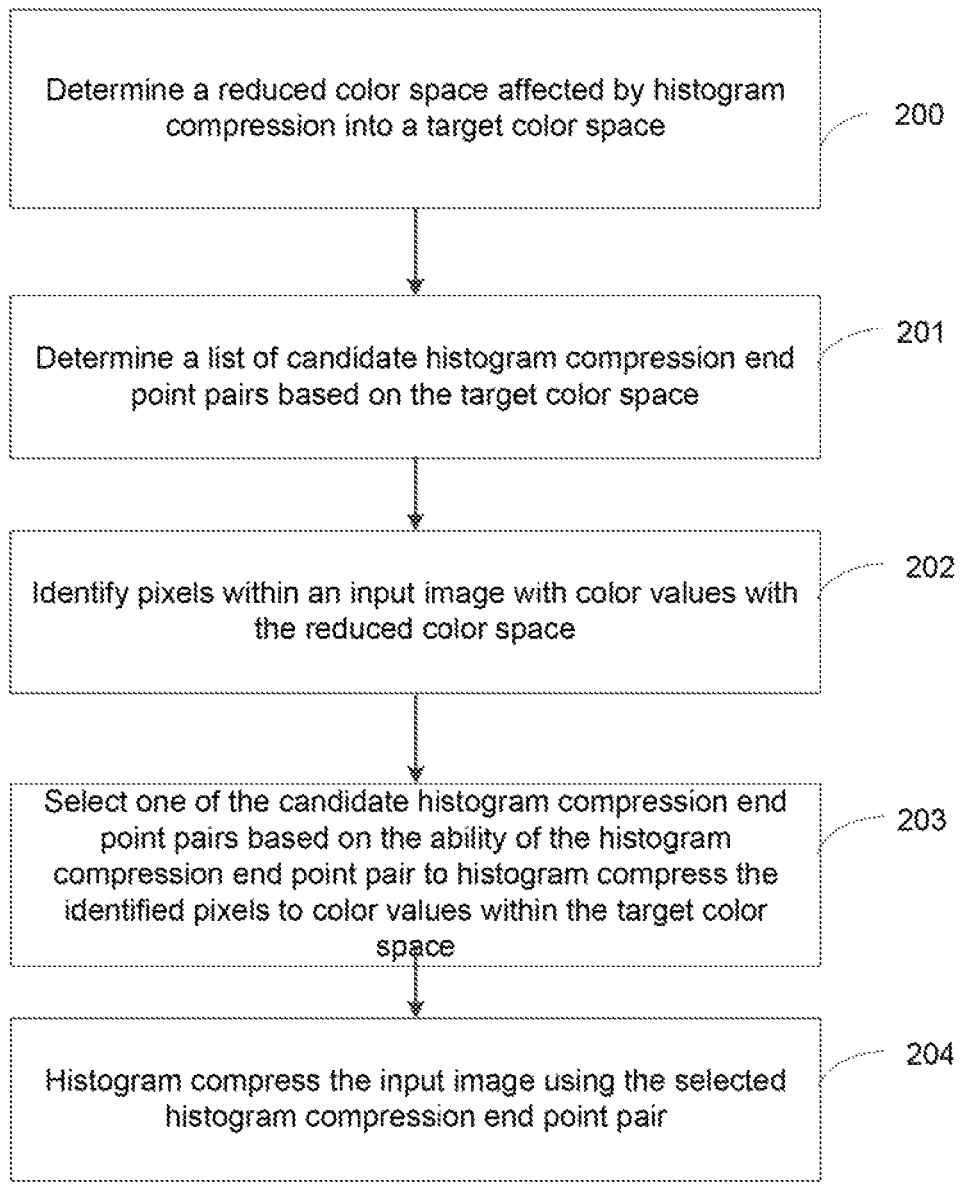
FIG. 2 is a flow chart illustrating one example of a method to select an image histogram compression end point pair based on a target color space range.

FIG. 2 is a flow chart illustrating one example of a method to select an image histogram compression end point pair based on a target color space range. A histogram compression end point pair may be used to compress the color space range of an image based on a pair of values indicating a maximum and minimum histogram compression value such that colors are linearly compressed between the pair of values. A processor may select a histogram compression end point pair for a particular input image. For example, the processor may select the histogram compression end point pair based on the impact on the colors of the particular image such that the image meets histogram compression criteria, but does not cause excessive additional histogram compression. The processor may select the histogram compression end point pair based on stored information related to candidate histogram compression end point pairs and analysis on how the candidate histogram compression end point pairs operate on the input image. The method may be implemented, for example, by the processor 101 of FIG. 1.

Beginning at 200, a processor determines a reduced color space affected by histogram compression into a target color space. The reduced color space may be a subset of any suitable full color space, such as an RGB 0-255 color space. Other color ranges, such as 0 to 65535 may be used or a color space other than RGB. The target color space may be a constraint related to providing space in the low and high ends of a color spectrum for each color channel. The target color space information may indicate both a low end color channel constraint and a high end color channel constraint. The target color space may include different constraints for different color channels. For example, for a blue channel in a R,G,B color the value may be targeted to be above a minimum low value constraint of 3 and less than a maximum high value constraint of 252 such that the color channel value of B is targeted to be between 4 and 251, and a green color channel value may be constrained to a value between 6 and 255. A processor may histogram compress an input image such that an amount of the image above a threshold is within the target color space. In one implementation, the target color space is associated with a threshold, such as where 95% of the color pixels of an input image are to be within the target color space range after being histogram compressed. In one implementation, a processor automatically determines the target color space based on the post-processing operation to be performed on the histogram compressed image.

The processor may determine a reduced color space that indicates the set of color values affected by histogram compression to reach the target color space range. For example, colors with values outside of the target color space range and colors that become outside of the target color space range when histogram compressed may be identified as part of the reduced color space. The processor may store information related to the reduced color space such that it may be compared to the colors in an input image when an input image is to be histogram compressed.

Continuing to 201, a processor determines a list of candidate histogram compression end point pairs based on the target color space. The processor may determine the list of candidate histogram compression end point pairs based on the ability of a histogram compression end point pair to compress at least one color channel value outside of the target colors space range into the target color space range for the particular color channel. As an example, if a blue color channel constraint is for the color value to be 3 or greater, a first potential histogram compression end point pair may be (3,255) such that red, green, and blue color channels are histogram compressed into values between 3 and 255, and a second histogram compression end point pair may be (2, 255) such that red, green, and blue color channels are compressed into values between 2 and 255. The potential histogram compression end point pairs may compress fewer than all potential color values outside of the target color space due to the fact that a subset of a particular input image's pixels may include color values outside of the target color space range.

The processor may store information about the candidate histogram compression end point pairs. When the processor receives an input image to histogram compress, the processor may analyze the limited set of candidate histogram compression end point pairs in view of the input image.

Continuing to 202, a processor identifies pixels in an input image with color values within the reduced color space. The processor may receive an input image in any suitable manner, such as via a network, and the input image may be any suitable input image, such as a digital image. The processor may analyze the pixels within the input image to determine the subset of pixels within the input image in the reduced color space, effectively which are to be impacted by histogram compression to have color values within the target color space range. The processor may determine which of the colors in the reduced color space are in the input image and/or the number of pixels in the input image in each of the colors in the reduced color space.

Continuing to 203, a processor selects one of the candidate histogram compression end point pairs based on the ability of the histogram compression end point pair to histogram compress the identified pixels to color values within the target color space. For example, the processor may select the histogram compression end point pair based on the number of pixels of colors within the reduced color space compressed within the target color space and/or characteristics of the particular pixels with color values within the reduced color space histogram compressed within the target color space, or vice versa. For example, the processor may select a histogram compression end point pair that histogram compresses a number of pixels with color values in the reduced color space into the target color space such that the total number of pixels with color values within the target color space is above a threshold. The processor may select the histogram compression end point pair capable of histogram compressing a percentage of the input image pixels above the threshold into the target space while histogram compressing by the smallest amount. The processor may select the histogram compression end point pair by limiting its analysis of the histogram compression end point pair to the identified pixels with color values in the reduced color space because additional pixels with color values outside of the reduced color space will remain in the target color space range regardless of whether histogram compression is applied or which of the candidate histogram compression end point pairs is used to apply histogram compression.

In one implementation, the processor further selects one of the candidate histogram compression end point pairs based on a prioritization rule. For example, a prioritization rule may prioritize histogram compression end point pairs with less histogram compression on the low value/dark end of the color spectrum. The processor may iterate through the list of histogram compression end point pairs in order of the prioritization and select the first histogram compression end point pair satisfying the criterion that threshold number and/or percentage of pixels within an input image have color values within the target color space range.

Continuing to 204, a processor histogram compresses the input image using the selected histogram compression end point pair. For example, the color space range of the image may be reduced by operating on the input image identified pixels with color values in the reduced color space using the selected histogram compression end point pair.

In one implementation, the processor increases efficiency by using the stored reduced color space information and candidate histogram compression end point pair information to apply to other input images to compress the images within the same target color space. The second input image may be compared to the reduced color space to determine the pixels of the second input image within the reduced color space. The candidate histogram compression end point pairs may be compared to the pixels of the second input image with color values within the reduced color space to select a candidate histogram compression end point pair. The histogram compression end point pair applied to the second image may differ from the histogram compression end point pair applied to the first image according to which colors in the reduced color space and how many pixels with those color values are in the second input image. The stored candidate histogram compression end point pairs and reduced color space information may be determined for different target color space constraints such that the corresponding stored information may be selected for the analysis.

Figure 3A:
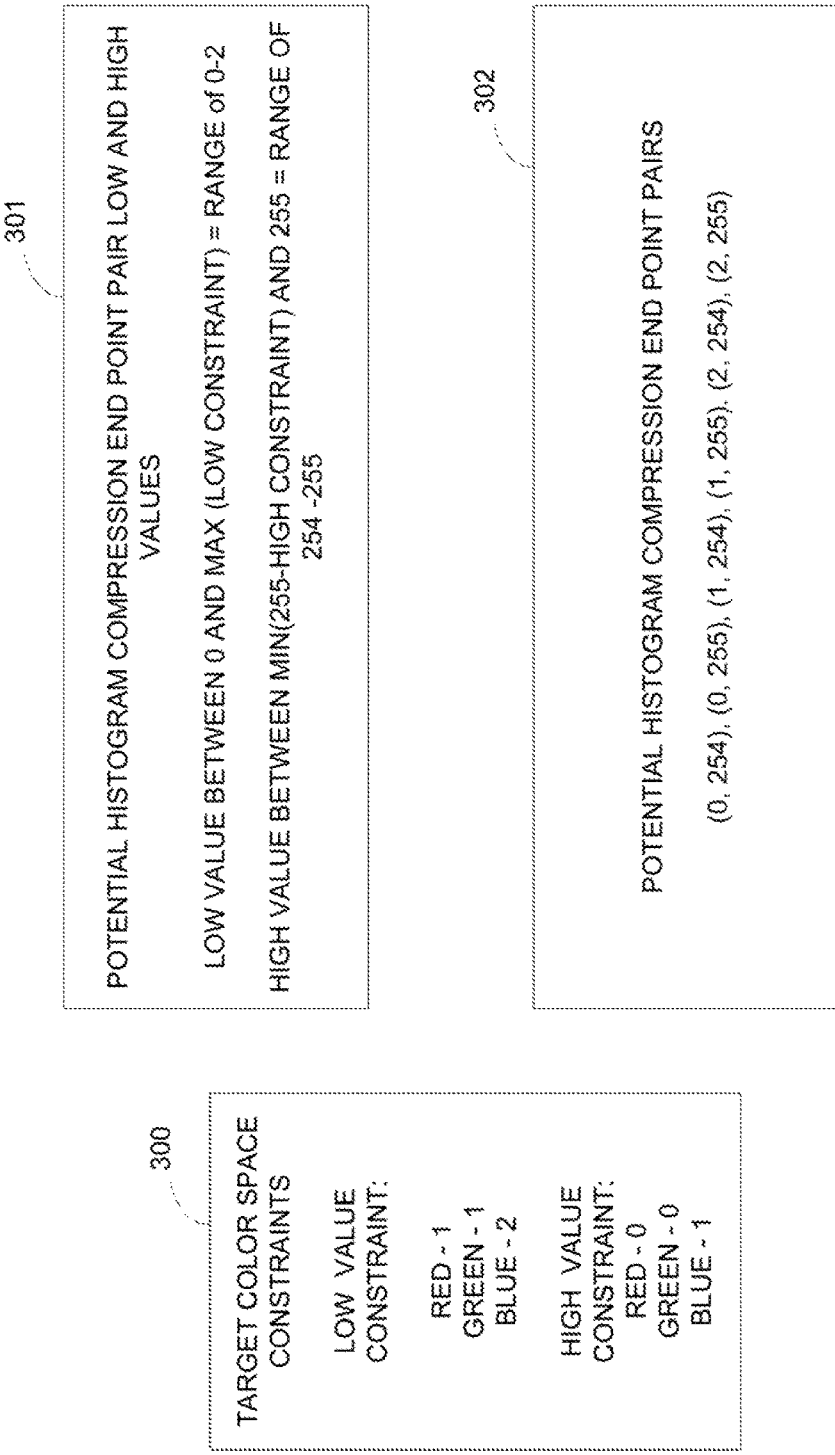

FIG. 3A-3E are diagrams illustrating an example of selecting a histogram compression end point pair based on a target color space range. FIG. 3A is a diagram illustrating a set of candidate histogram compression end point pairs selected based on a target color space. Block 300 shows target color space shift room criteria for histogram compression where the shift room indicates the color value constraint on either end of the color spectrum. The color value constraint may be different at the high and low end and different for different color channels. For example, at the low end, a color value constraint room of 1 for the red channel, 1 for the green channel, and 2 for the blue channel is desired, and at the high end a color value constraint room of 0 for the red channel, 0 for the green channel, and 1 for the blue channel. As such, once histogram compressed the red color channel for a color should be between 3 and 253 for at least a number and/or percentage of pixel color values above a threshold.

Block 301 shows potential histogram compression end point pairs low and high values. For example, the low value is between 0 and the max of the low constraint, and the high value is between the min of 255-high constraint and 255. The resulting low values are 0 to 2 and the resulting high values are 254 to 255.

Block 302 shows a list of potential histogram compression end point pairs based on the determined low and high values in block 302. There are six options based on the combinations of the 3 low value spectrum options and the 2 high value spectrum options.

A processor, such as the processor 101, may determine the low and high values of the histogram compression end point pairs and the corresponding list of candidate histogram compression end point pairs. The number of potential histogram compression end point pairs may vary based on the size of the shift room color value constraints for the target color space. In one implementation, the processor also determines the size of the color space range, such as based on a desired type of post processing to be performed on the histogram compressed image.

Figure 3B:
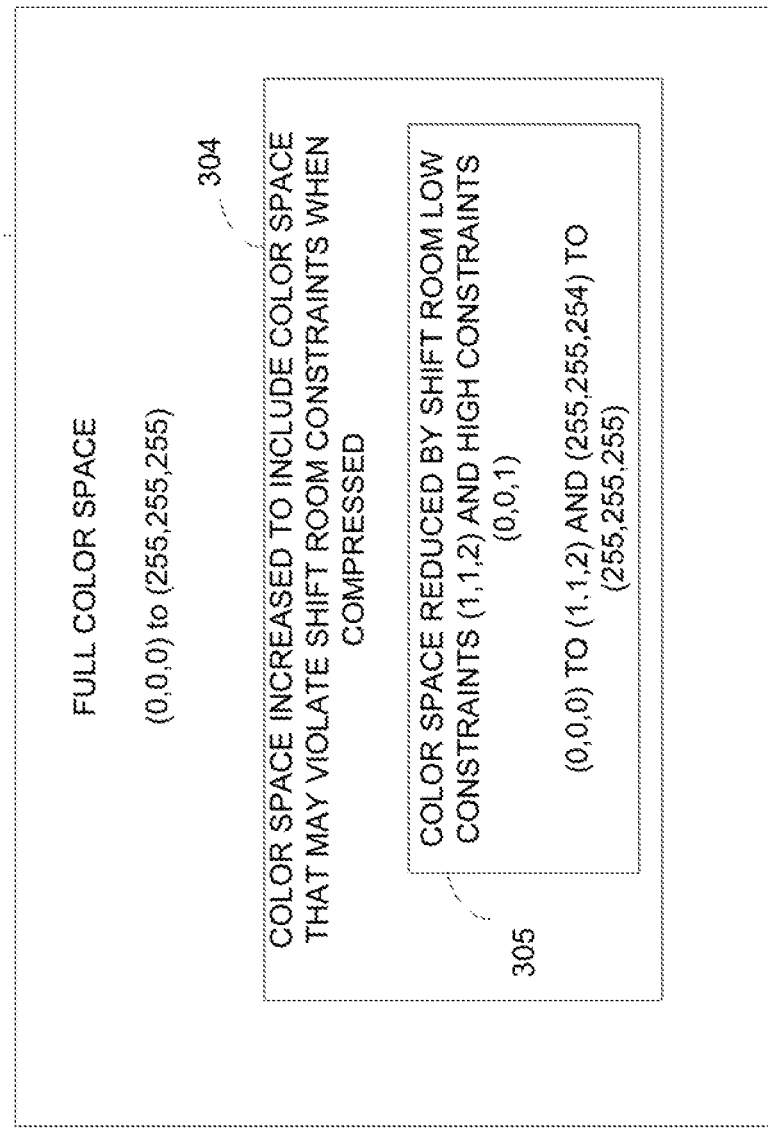

FIG. 3B is a diagram illustrating one example of a reduced color space based on a target color space. A processor may first determine a reduced color space affected by a histogram compression and select a histogram compression end point pair based on an analysis in view of the reduced color space. The full color space 303 includes all possible 16,777,216 colors, assuming an R,G,B color space with 256 possible color values for each channel. A processor may determine a first reduced color space 305 that violates the color value constraints by being outside of the target color space range such that the colors in the first reduced color space will be histogram compressed to fall within the target color space range. For example, color ranges from (0,0,0) to (1,1,2) and (255, 255, 254) to (255,255,255) are included within the reduced color space 305. Color space 304 includes the colors in color space 305 in addition to colors that are within the target color space range but will fall outside of the target color space range when histogram compressed with at least one of the potential histogram compression end point pairs in block 302 of FIG. 3A.

FIG. 3C shows a set of histogram compression end point pairs applicable to each of the colors in a reduced color space. For example, a processor may compare the potential histogram compression end point pairs in the block 302 of FIG. 3A to the colors in the reduced color space 305 in FIG. 3B. For example, color (0,0,0) is in the reduced color space 305 and may be histogram compressed to a color within the color value constraints using either histogram compression end point pair (2, 255) or (2, 254) in the list of potential compression end point pairs. In one implementation, a processor determines the information in block 306 and stores the information in a storage such that the information may be compared to multiple input images.

FIG. 3D shows the application of the information in block 306 of FIG. 3C to an input image. A processor may compare color information in an input image to the information in block 306. Chart 307 lists the candidate histogram compression end point pairs and shows the number of pixels for each color in the reduced color space in an input image of 120 pixels that are histogram compressed into the target color space range. Additionally, there are 80 pixels with color values that are within the target color space range and remain within the target color space range after histogram compression is applied. As an example, histogram compression end point pair 1, 255 results in 114 of the 120 pixels in the input image having a color value within the target color space. A processor may then determine which of the potential histogram compression end point pairs to select based on the information in chart 307. Block 308 shows a 5% threshold for a percentage of pixels outside of the color value constraints of the target color space range after histogram compression. For example a target watermark strength may be associated with a particular color value constraint, but it may be possible to create the watermark with a certain number or percentage of pixels with color values outside of the desired color value constraints. Block 308 shows a threshold of 5% of pixels or less with color values outside of the color value constraints of the target color space range when the input image is histogram compressed. A processor may compare the information in chart 307 to the threshold to select a subset of the candidate histogram compression end point pairs, in this case (1, 255), (2, 255), (1, 254), and (2, 254). The processor may select between the potential histogram compression end point pairs in any suitable manner. In one implementation, the processor selects the first histogram compression end point pair determined to meet the shift room and threshold constraints. In one implementation, the histogram compression end point pair resulting in the most pixels within the reduced color space being histogram compressed into the shift constraints is selected.

FIG. 3E shows a method of selecting between the histogram compression end point pairs based on prioritization information. For example, a processor may prioritize the histogram compression end point pairs based on criteria, and the processor make break ties based on the number of pixels histogram compressed to have color values within the color value constraints along with the additional criteria. Block 309 shows the 6 potential histogram compression end point pairs from block 302 prioritized into 4 levels. A processor may select a histogram compression end point pair on a lower level where multiple compression end point pairs have the same effect of histogram compressing at least the minimum threshold number or percentage of pixels with color values within the reduced color space into the target color space range. The processor may prioritize the histogram compression end point pairs in any suitable manner. In one implementation, the processor prioritizes the histogram compression end point pairs such that histogram compression pairs compressing more on the high end of the color channel spectrum are selected or vice versa. Of the four candidate histogram compression end point pairs shown in block 308, the histogram compression end point pair (1, 255) is selected because it is associated with the highest prioritization.

Figure 4:
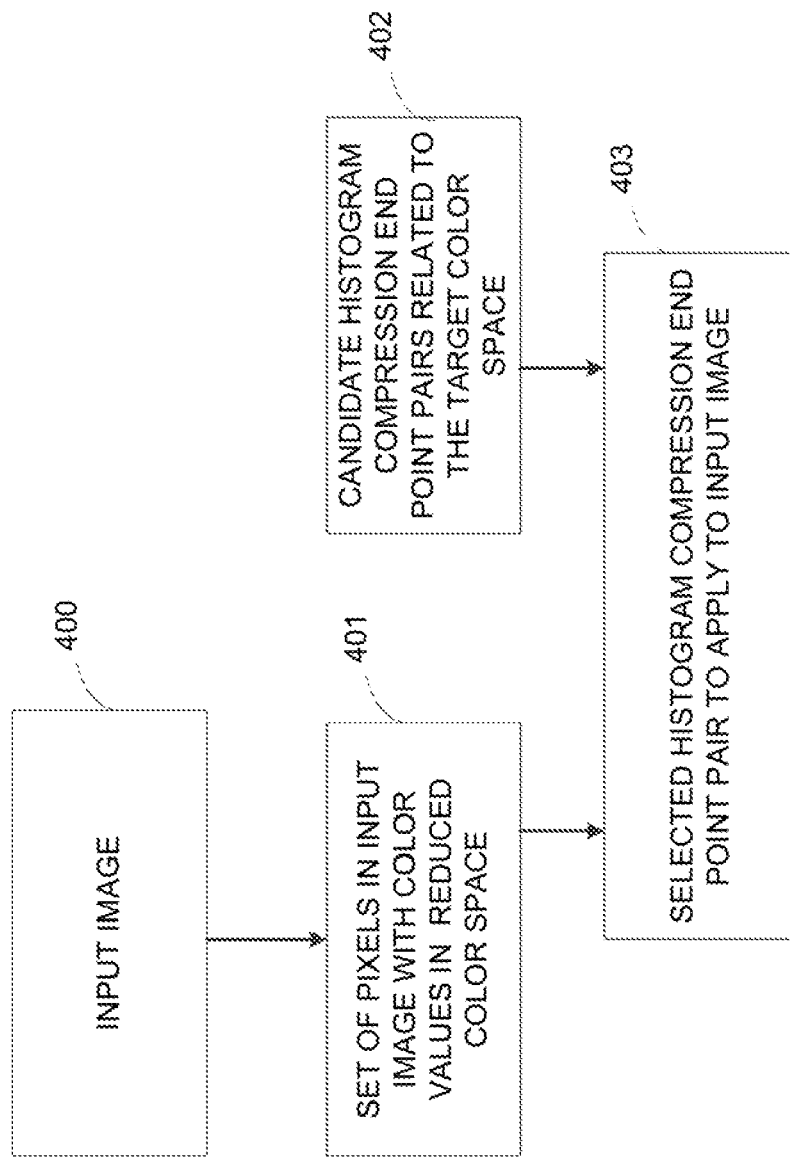
FIG. 4 is a block diagram illustrating one example of selecting histogram a histogram compression end point pair based on a comparison of an input image to a set of candidate histogram compression end point pairs.

FIG. 4 is a block diagram illustrating one example of selecting a histogram compression end point pair based on a comparison of an input image to a set of candidate histogram compression end point pairs. Input image 400 is received by a processor, and the processor identifies the set of pixels in the input image with color values in the reduced color space 401. The reduced color space may include colors that are likely to be affected by histogram compression such as by being outside of the target color space or being outside of the target color space when histogram compressed with a candidate histogram compression end point pair. The processor identifies candidate histogram compression end point pairs 402 based on the target color space range and the associated reduced color space. The information in block 402 may be determined based on the desired target color space range and be stored to be applied to multiple input images. Likewise, information about the colors in the reduced color space may be stored such that at the time of processing, the processor may compare the color value of pixels of the input image to the set of colors identified in the reduced color space. The processor may identify the selected histogram compression end point pair 403 based on the information in blocks 401 and 402.

Figure 5:
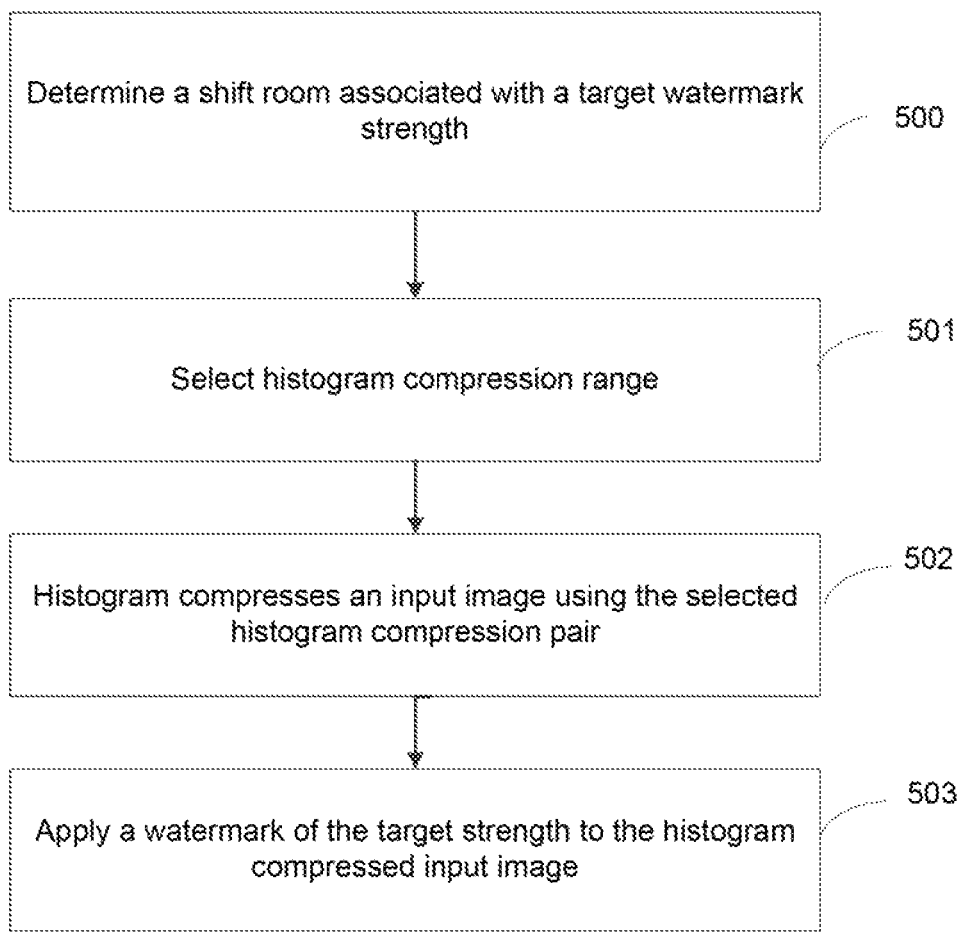
FIG. 5 is a flow chart illustrating one example of a applying a watermark to an image based on a selected histogram compression end point pair.

FIG. 5 is a flow chart illustrating one example of a applying a watermark to an image based on a selected histogram compression end point pair. Beginning at 500, a processor determines a target color space associated with a target watermark strength. For example, a shift room may be associated with a color space such that the target color space leaving a shift room with no or fewer pixels in certain colors on the extreme ends of the color spectrum. The target color values may be different for each color channel. Continuing to 501, the processor selects a histogram compression end point pair. For example, the processor may select the histogram compression end point pair based on a target color space, reduced color space relevant to histogram compression into the target color space, pixel threshold, and pixel color values in the reduced color space in the input image. The processor may select the histogram compression end point pair based on the method described in FIG. 2.

Continuing to 502, the processor histogram compresses an input image using the selected histogram compression end point pair. The histogram compressed version of the image may include a smaller tonal range with the desired shift room at the low and high end of the color channels such that a number and/or percentage of pixels above a threshold are have color values within the target color space outside of the shift room. Continuing to 503, the processor applies a watermark of the target strength to the histogram compressed input image. For example, the histogram compressed version of the image may include a shift room with fewer colors that allows the watermark to be applied.

The invention claimed is:

1. A computing system, comprising:
a storage to store:
information related to a reduced color space relevant to a target color space range; and
a list of candidate histogram compression end point pairs related to the target color space; and
a processor to:
determine pixels within an input image with color values within the reduced color space;
select one of the stored histogram compression end point pairs based on a comparison of the stored histogram compression end point pairs to the determined pixels; and
histogram compress the input image using the selected histogram compression end point pair.

2. The computing system of claim 1, wherein selecting one of the stored histogram compression end point pairs comprises:
prioritizing the list of candidate histogram compression end point pairs; and
selecting the stored histogram compression end point pair based on the prioritization.

3. The computing system of claim 1, selecting one of the stored histogram compression end point pairs comprises:
determining the amount of pixels in the input image with color values within the reduced color space when histogram compressed by the selected histogram compression end point pair; and
comparing the determined amount of pixels to a threshold.

4. The computing system of claim 1, wherein the candidate histogram compression end point pairs comprise histogram compression end point pairs satisfying possible ranges between a target low color value and a target high color value for a color channel.

5. The computing system of claim 1, wherein the reduced color space includes at least one of: pixels with color values outside of the target color space and pixels with color values likely to be outside of the target color space when histogram compressed.

6. A method, comprising:
determining, by a processor, a reduced color space affected by histogram compression into a target color space;
determining a list of candidate histogram compression end point pairs based on the target color space;
identifying pixels within an input image with color values in the reduced color space;
selecting one of the candidate histogram compression end point pairs based on the ability of the histogram compression end point pair to histogram compress the identified pixels in the reduced color space to color values within the target color space; and
histogram compressing the input image using the selected histogram compression end point pair.

7. The method of claim 6, further comprising determining the reduced color space to include pixels with color values inside the color value range but outside of the color value range when histogram compressed with at least one of the candidate histogram compression end point pairs.

8. The method of claim 6, further comprising selecting a second candidate histogram compression end point pair to apply to a second input image.

9. The method of claim 6, wherein selecting one of the candidate histogram compression end point pairs is further based on a prioritization rule.

10. The method of claim 9, wherein the prioritization rules prioritizes histogram compression end point pairs with less histogram compression on the end point related to the low end histogram compression.

11. A machine-readable non-transitory storage medium comprising instructions executable by a processor to:
- select a histogram compression end point pair from a list of histogram compression end point pairs related to a target color space range,
- wherein the selection is based on the results of the application of the histogram compression end point pair to the pixels within the input image with color values within a reduced color space determined based on the target color space range; and
- apply the selected histogram compression end point pair to the input image to histogram compress the input image.

12. The machine-readable non-transitory storage medium of claim 11, further comprising instructions to select the histogram compression end point pair based on a prioritization rule related to the histogram compression end point pair.

13. The machine-readable non-transitory storage medium of claim 11, further comprising instructions to:
- iterate through the list of histogram compression end point pairs in order of the prioritization; and
- select the first histogram compression end point pair satisfying an amount of pixels in the input image above a threshold with color values within the input image reduced color space.

14. The machine-readable non-transitory storage medium of claim 11, further comprising instructions to determine the target color space room based on a shift room associated with a target watermark strength.

15. The machine-readable non-transitory storage medium of claim 14, further comprising instructions to apply a watermark of the target strength to the histogram compressed input image.

* * * * *

UNITED STATES PATENT AND TRADEMARK OFFICE
CERTIFICATE OF CORRECTION

PATENT NO. : 10,469,850 B2  
APPLICATION NO. : 15/558938  
DATED : November 5, 2019  
INVENTOR(S) : Bruce Williams Page 1 of 1

It is certified that error appears in the above-identified patent and that said Letters Patent is hereby corrected as shown below:

In the Drawings

In sheet 3 of 9, FIG. 3A, reference numeral 301, Line 5 (Approx.), delete "254 -255" and insert -- 254-255 --, therefor.

Signed and Sealed this
Twenty-fourth Day of March, 2020

Andrei Iancu
*Director of the United States Patent and Trademark Office*